(12) United States Patent
Smith et al.

(10) Patent No.: US 11,170,607 B2
(45) Date of Patent: Nov. 9, 2021

(54) CONTINUOUS GENERATION, DYNAMIC RANKING, AND DELIVERY OF QUERIES TO USER

(71) Applicant: UNBLOCKABLE, INC., Santa Monica, CA (US)

(72) Inventors: Eben Smith, Santa Monica, CA (US); Greg Dean, Santa Monica, CA (US); Gianni Settino, Santa Monica, CA (US); Jesse Pizarro, Los Angeles, CA (US)

(73) Assignee: UNBLOCKABLE, INC., Santa Monica, CA (US)

( * ) Notice: Subject to any disclaimer, the term of this patent is extended or adjusted under 35 U.S.C. 154(b) by 0 days.

(21) Appl. No.: 16/719,825

(22) Filed: Dec. 18, 2019

(65) Prior Publication Data

US 2020/0320821 A1 Oct. 8, 2020

Related U.S. Application Data

(60) Provisional application No. 62/914,963, filed on Oct. 14, 2019, provisional application No. 62/885,512, filed on Aug. 12, 2019, provisional application No. 62/830,157, filed on Apr. 5, 2019.

(51) Int. Cl.
*G07F 17/32* (2006.01)
*G06F 16/9537* (2019.01)
*G06F 16/9538* (2019.01)
*G06F 16/9535* (2019.01)

(52) U.S. Cl.
CPC ........ *G07F 17/323* (2013.01); *G06F 16/9535* (2019.01); *G06F 16/9537* (2019.01); *G06F 16/9538* (2019.01)

(58) Field of Classification Search
CPC .............. G07F 17/323; G06F 16/9535; G06F 16/9537; G06F 16/9538
USPC .......................................................... 463/42
See application file for complete search history.

(56) References Cited

U.S. PATENT DOCUMENTS

| | | | |
|---|---|---|---|
| 8,449,361 B2 | 5/2013 | Laycock et al. | |
| 8,858,313 B1 | 10/2014 | Selfors | |
| 9,028,260 B2* | 5/2015 | Nanjiani | G09B 7/02 434/323 |
| 9,870,674 B2* | 1/2018 | Hayon | G07F 17/32 |
| 2009/0005141 A1* | 1/2009 | Lehtiniemi | A63F 13/335 463/9 |
| 2009/0061978 A1* | 3/2009 | Ahlin | G06Q 30/02 463/16 |
| 2012/0142428 A1* | 6/2012 | Wilson | A63F 13/79 463/42 |
| 2014/0162742 A1* | 6/2014 | Dempsey | A63F 13/828 463/4 |

(Continued)

*Primary Examiner* — Allen Chan
(74) *Attorney, Agent, or Firm* — Perkins Coie LLP (57) ABSTRACT

Disclosed herein is an application enabling users to interface dynamically with live sports. The application monitors active sports games and generates propositions based on the status of the game and presents the propositions to users. Users accept the proposition or move on to additional propositions. The propositions are generated, en masse, each second of game and ranked according to a series of criteria. The criteria are used to provide an artificial intelligence approximation of the most exciting question in sports that moment.

9 Claims, 4 Drawing Sheets

(56) References Cited

U.S. PATENT DOCUMENTS

2015/0024814 A1\* 1/2015 Root .................. A63F 13/30
                                                  463/3
2017/0003740 A1\* 1/2017 Verfaillie ............ A63F 13/87

\* cited by examiner

CONTINUOUS GENERATION, DYNAMIC RANKING, AND DELIVERY OF QUERIES TO USER

CROSS-REFERENCE TO RELATED APPLICATIONS

This application claims the benefit of U.S. Provisional Patent Application Ser. No. 62/914,963, filed Oct. 14, 2019, U.S. Provisional Patent Application Ser. No. 62/885,512, filed Aug. 12, 2019, and U.S. Provisional Patent Application Ser. No. 62/830,157, filed Apr. 5, 2019. The aforementioned applications are incorporated herein by reference in their entirety.

TECHNICAL FIELD

The disclosure relates to the continuous presentation of procedurally generated queries to users in a ranked order.

BACKGROUND

Sportsbook betting is slow and based on pre-established queries originating before relevant athletic contests begin. For example, during the National Football League ("NFL") Super Bowl often a number of proposition bets ("prop bets") are created long before the game begins and are unchanging while the game is in progress. There is a need to improve upon schemes in order to provide a more dynamic experience where betting queries are generated during games and based on the action that is happening as the game progresses.

DETAILED DESCRIPTION

Disclosed herein is an application enabling users to interface dynamically with live sports. During one or more athletic contests (multiple may occur simultaneously), the application receives input from a feed of the athletic contest (e.g., via a media feed or a gambling feed) describing events occurring in the given contest. From the contest feed input, the application generates a number of queries (e.g., Will Stephen Curry make a 3-point shot in the next two minutes? Will Tom Brady get sacked during his next drive? Will player X score points in the next Y minutes?) concerning the relevant contest(s). The queries are generated during the contests, preferably each second (~50 per second, per contest). A machine learning model operating on the backend of the application ranks the queries according to a set of criteria. Queries may then be delivered to users in ranked order.

In some embodiments, the queries operate on a yes or no basis. When presented with a query, the users may swipe on their user interface to indicate an answer to the query. In some embodiments, the user may answer "yes," or indicate disinterest in the query only. Queries pend on the user interface for a brief period (e.g., 10-30 seconds, or 15 seconds). Queries preferably operate in the time scale of minutes of game time. The queries concern game actions that may occur next, or soon in the relevant contest(s). When one query is resolved, either through user engagement, or by expiring due to time lapse, a new query is presented to the user. Users who engage positively with queries that correctly predict mid-contest outcomes are awarded points, money, or some other beneficial reward.

Figure 1:
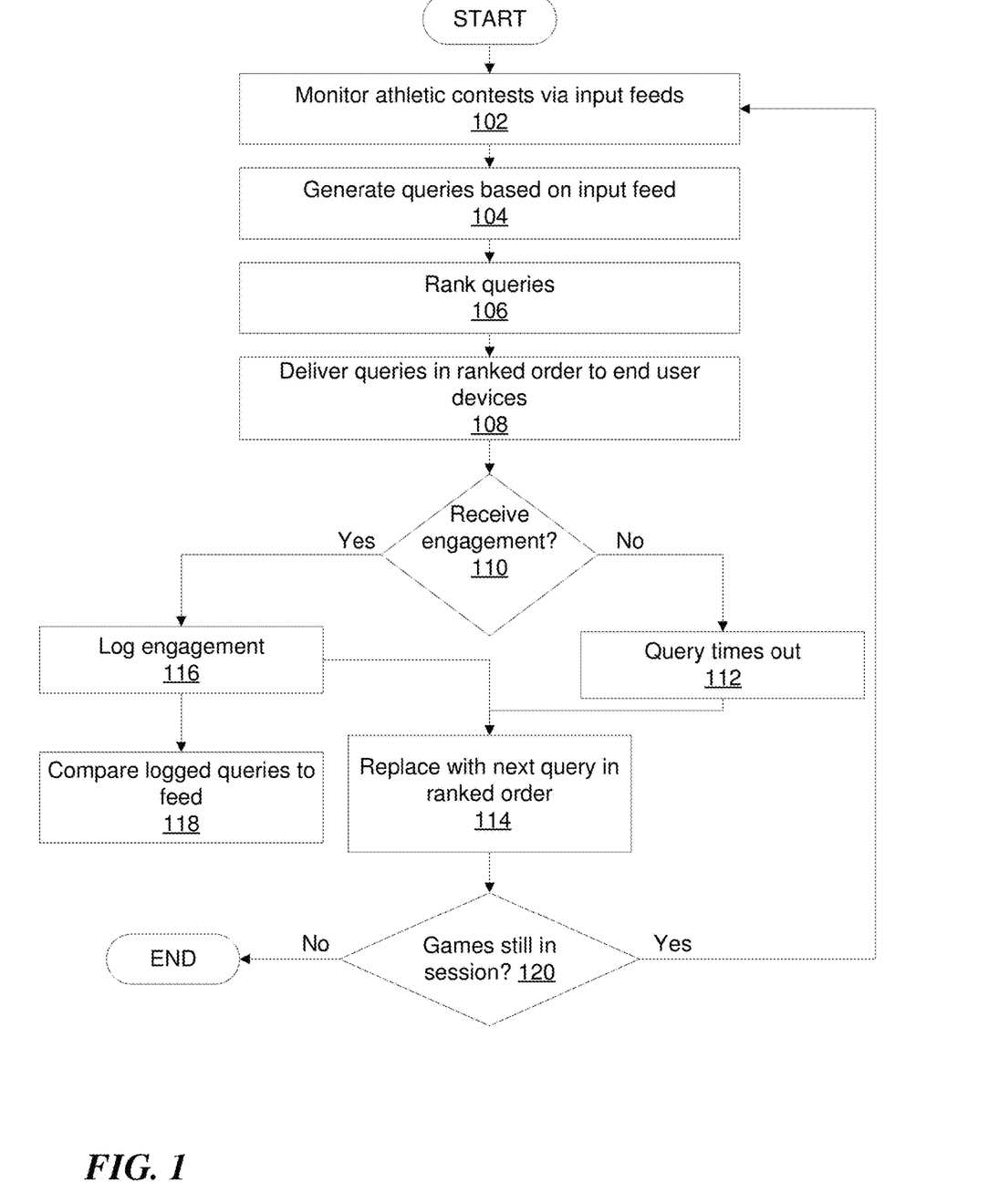
FIG. 1 is a flowchart illustrating an application flow.

FIG. 1 is a flowchart illustrating an application flow. In step 102, a backend application server monitors one or more athletic contests (e.g., NFL games, National Basketball Association (NBA) games, Major League Baseball (MLB) games, National Hockey League (NHL) games, Major League Soccer (MLS) games, games in college leagues, games occurring in non-American leagues, international competitions, video games and e-sports, etc.) via an input feed(s) of all relevant athletic contests. The input feed describes events occurring in each contest (e.g., a play-by-play, stats crediting, game actions, notice of commercial breaks, etc.). When games occur simultaneously, within the same league or across leagues/sports, multiple feeds are monitored.

In step 104, the backend application server generates queries based on the input feed(s). In some embodiments the queries are yes/no format. In some embodiments, the queries are multiple choice. In some embodiments, the queries include short answer fields. The queries are procedurally generated based on conditions within each sports game being monitored via the input feed(s). Procedural generation of questions is performed by generating all permutations of a number of query formats that include a predetermined number of variables. In some embodiments, the system is configured to heuristically reduce the number of permutations (N) by filtering based on the game feed (e.g., values for variables that would refer to teams/players not playing are not generated). In some embodiments, queries are not actively generated and instead a pre-generated list of possible queries is repeatedly subjected to step 106 described below. Pre-generating queries removes computation time for step 104, and instead burdens the processing expense of step 106 below.

Queries may include permutations of, "Will player/team X perform game action Y, within Z time?" for all active games, each second of the game. The generated queries shift the variables to different possible values. In some embodiments, queries are generated for every possible permutation of variables. In the (X, Y, Z) example, the X value is for an actor (e.g., player(s), team(s), position(s) held by player(s)), the value of Y is for an action (e.g., score points, assist, takeaway, etc. . . . ), and the value for Z is a time component (e.g., absolute clock time, relative game clock time, or variable, but identifiable temporal segments like plays or ball possessions). In some cases, these values can have an associated magnitude. If the action component is points, the magnitude may be the number of points referred to in the query. If the time component is seconds, the magnitude may be the number of seconds.

The game actions are sport specific, for example, queries would not reference a baseball player when asking if the player would score a touchdown. Accordingly, the possible variables include assigned metadata that indicates which sport/team/position the player or action is associated with. In some embodiments, queries are only generated for feasible circumstances. For example, no query is generated for players whom are not actively present in the game (defensive players while the offense is on the field, bench players whom just left the court/rink/field), or players who are injured and out.

The sample queries provided above serve as illustrative examples and are not limiting on the query style/type. Queries may refer to multiple players, multiple teams, or, multiple actions. Each query includes a set of metadata. The metadata is based on any combination of the query style/type, the variables used within the specific query, and the game state when the query is generated.

In step 106, a machine learning model operating on the backend application server ranks the queries according to a set of criteria. In some embodiments, the queries are ranked both on an application wide level and again on a personal level. When individual users make choices to engage with a particular style of query (e.g., a user whom regularly engages with queries pertaining to scoring touchdowns), that engagement increases the rank of future queries with a similar style. Similarly, the users may apply specific filters to the queries, such as only to sports they are interested in (e.g., a user who has no interest in baseball can apply a filter to de-rank all baseball related queries).

Queries are ranked on an application wide level. Ranking of queries is based on a number of factors directed at targeting user "excitement." Queries that pertain to more popular players or more exciting actions are given a higher rank (e.g., the asking whether the star player will score points is ranked higher than asking whether a less popular player assists on the score). In some embodiments queries are additionally ranked based on application-wide user engagement. The manner in which application-wide user engagement affects ranking of queries is based on the user reward structure of the application. In a betting scenario, if one query becomes over leveraged by the user base, the application may de-rank that query in order to reduce overall risk on that query, or up-rank the opposite side of the over leveraged query in order to balance risk. If a given query is trending positively in engagement, but the application is not overleveraged, the model up-ranks the query in order to place that query in front of more users. In a casual gameplay scenario where leverage of the house on a particular query is meaningless, positive trends in user-base engagement serve to up-rank the query.

In step 108, queries are then delivered to users, one at a time, in ranked order. The queries appear on a user device running a client instance of the application. In step 110, the instance of the application waits for engagement by a user. In step 112, where the user does not engage within a threshold period of time, the current query times out and is replaced with a new query in step 114. In step 116, where the user engages with a query, the user's stake/association with the query is logged and the logged query is replaced with a new query in step 114.

In step 118, logged queries are compared with the input feed for as long as they are active. Where the user correctly predicts game actions (via a logged query), the user is awarded the associated reward for being correct. In some embodiments, the reward is greater if the user was correct multiple times in a row. In step 120, the application determines if there are sports games still in session. If there are games in session, the process repeats.

Figure 2:
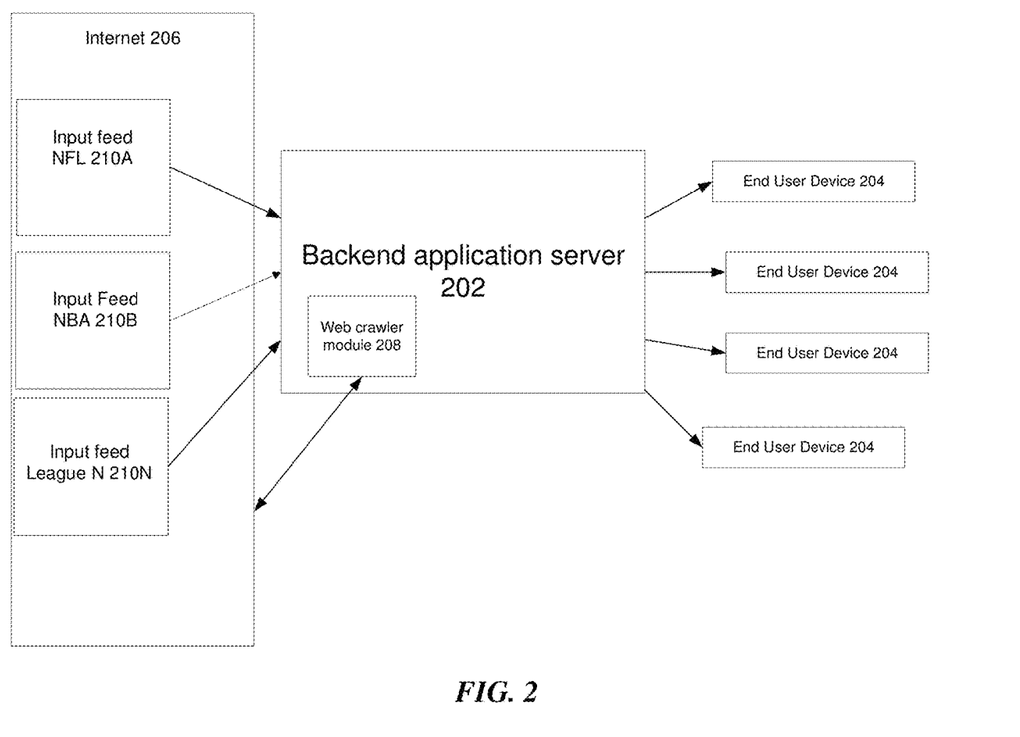
FIG. 2 is a block diagram illustrating a machine learning system executing a query ranking operation.

FIG. 2 is a block diagram illustrating a machine learning system 200 executing a query ranking operation. Query ranking is similar to generating a search rank in a search engine, where the search engine only operates with one question: "what is the best query in sports right now?" The machine learning system operates on a backend application server 202. The machine learning system may be constructed using multiple models. Examples of potential model architectures include hidden Markov models, convolutional neural networks, and deep learning networks. Each of the models may be supervised, unsupervised or semi-supervised. In some cases, pre-programmed artificial intelligence and heuristics operate to come to arrive at query ranks.

The backend application server 202 communicates directly with user devices 204 through client application software instances executing on the user devices 204. The client application software provides a graphic user interface for the individual users. Through the graphic user interface, users engage with queries supplied by the backend application server 202.

The backend application server 202 further communicates with the Internet 206 via web crawlers 208 that return data about websites to the backend application server 202 for processing. The backend server 202 further communicates with an input feed 210 that delivers up to the moment information about active athletic contests. In some embodiments multiple input feeds 210 originating from differing sources communicate with the backend server 202. The input feeds 210 corresponding to different games, or different leagues may originate from different sources. In some embodiments the input feed 210 is a media feed provided by the relevant league to media outlets for the purpose of broadcasting content related to the athletic contest. In some embodiments the input feed 210 is a gaming or gambling feed used to provide information to gambling outlets concerning the outcome of athletic contests.

Factors that the machine learning models uses to evaluate that question include: game affinity, player statistical affinity, participant affinity (specific to that player-game relationship), end user affinity (personalization based on user's preference), operational affinity (features based on the house's goals), and competition affinity (specific to a user-competition relationship). Metadata associated with each query is used to evaluate as compared to the factors.

Game Affinity:

Game affinity refers to how much the particular game matters in sports. Users want to engage with queries related to games that are important. A playoff game, or a game against a rival has higher priority than a regular season game. A game with a lopsided score, a game that is currently in intermission (halftime, commercial break, etc.), or a game that hasn't quite started yet are inherently less interesting and are de-ranked. Games that have current action are up-ranked. Games that have closer scores between teams are also up-ranked.

In some embodiments, game affinity factors operate on absolute binary data (e.g., intermission or not). In some embodiments, game affinity factors operate on a comparative basis (e.g., there is an indirect correlation between the gap in team score and the value the ranking engine assigns the game). In some embodiments, game affinity factors operate on a pre-determined value (e.g., a regular season game is worth same first value to the ranking engine, whereas a playoff game is worth some second, higher value to the ranking engine). The pre-determined values may be applied as multipliers or additives.

Player Statistical Affinity:

Player statistical affinity refers to the star power of a given player that a query is about. Each player across sports has an individual value as compared to players at large, players in the same position, players in the same age group, and players from the same school, players from the same team, or players from another objectively defined group. The individual score is based on in game statistics, media buzz, and user engagement. In some embodiments, the individual value is applied on a per action basis (e.g., a player may have a higher value assigned to him/her when performing assists than scoring because he/she is known for that action).

In-game statistics may be objectively compared to one another on a one-to-one basis with matching statistic types. In some leagues/sports, there is an overall type statistic that is provided more weight than other statistics (e.g., hockey awards points for both goals and assists and football has a quarterback rating formula that is an amalgamation of multiple statistics). Some statistics are weighted as more impactful on the player's individual score in the query ranking system.

In some embodiments, players are assigned a Z-score that is used to evaluate the player rank. The Z-score operates cross-statistic and cross-sport. The Z-score is generated by a step to standardize statistics relative to their peers within the league, and then normalized between 0 and 1. To find the Z-score of a player, find the difference between a value for the player at a given statistic and the mean for that statistic at that player position, and divide the difference by the standard deviation for that statistic at that player position. Each Z-score is then scaled between 1 and 0 (e.g., $x\_new = (x - x\_min)/(x\_max - x\_min)$).

For example, if Player A produces rebounds at a rate of 0.30 per minute and Player B produces points at a rate of 1 per minute, then the Z-score transform turns these each into 0.95 and 0.91 respectively. The units for the Z-score are "statistical affinity," and may be applied evenly across all athletes and all sports. The ranking system is enabled to claim that Player A has a higher statistical affinity than Player B. The Z-score is applied inter-sport, where the ranking system can compare Player C's yards per carry as a running back to both Player A and Player B's basketball statistics via pure statistical affinity.

Media buzz is identified on an objective basis. In some embodiments, a web crawler is used to identify the number of unique pages on the internet that reference the given player (or team). In some embodiments, audio recognition is applied to sports television (e.g., ESPN's SportsCenter) and instances of recitations of each player's name are tallied. Appearances on some websites or television programs are weighted more highly than others (e.g., reference on ESPN's homepage is weighted more highly than a forum associated with an unaffiliated blogger). The value of a given page over another can be configured on a predetermined basis or on an objective basis that evaluated how recently the page was authored/updated as well as how many times that page is referenced by other pages.

User engagement is identified as an ongoing statistic affected by users engaging with queries generated by the system. When a user engages with a query associated with a particular player (or team), that players engagement score goes up. In some embodiments, the engagement score applies to an overall query rank in a logarithmic or asymptotic manner. Because engagement drives further engagement, effecting a search rank/query rank score with a direct correlation or better (e.g., linearly, exponentially, etc.) causes a snowballing effect that can dominate the system. Statistics that are generated in-system and affect search rank within the system can lead to having to great an effect on the system.

User engagement may be further used to influence query type (as opposed to player choice). For example, where users of the system tend to engage with queries regarding a particular game action (e.g., whether a kicking team, in football, will recover an on-side kick), the system up-ranks queries for that action. Query type may also refer to whether the queries are yes/no, multiple choice, or short answer. Query type may further refer to a risk/reward profile of the query. Queries may include a cost to engage with and reward some value of points based on a perceived likelihood of correctly predicting game events (e.g., scoring a safety in football is a relatively low occurring event, and thus, betting in favor of a safety has a higher risk). The opposite effect to rank is applied for when users allow a given query to time out and expire or send input that they are disinterested in that query. Queries that that the user base does not engage with are down-ranked.

In some embodiments, queries regarding players on a hot streak for a given statistic are up-ranked. After the ranking system receives notifications from the input feed (indicating game status) that a given player has exceeded a threshold statistic accumulation in a threshold time, the ranking system determines that player is on a "hot streak" and up-ranks queries that ask users whether the hot streak will continue. In some embodiments, the existence of a hot streak modifies the magnitude for variables within a given query.

Participant Affinity:

Participant affinity relates to the manner in which the given player associated with the query relates to the game he/she is playing in. The player is worth more to a ranking if the player is a starter as opposed to a bench player. Where the player is a bench player, a second-string player, or a player on a first line is valued higher than a third-string or second line player, respectively.

When the player is injured (questionable, doubtful, out, etc.) the player is de-ranked as less exciting to the particular contest. When the player is actively on the field/court/rink/ring/octagon/sports playing area, that player is up-ranked. Similarly, when the player's team has possession of a relevant game element (e.g., a ball) the player is up-ranked as well as that player is more likely subject of an exciting query. In the case where the player is a defensive player, not having possession of the relevant game element up-ranks the player instead (e.g., queries relating to defensive players like blocks and steals are more exciting when their team does not have possession).

End User Affinity (Personalization Based on User's Preference):

End user affinity refers to user specific effects on search/query rank that the user has an active role in influencing. The user can indicate to the application which sports he/she is most interested in and which players and teams he/she is interested in. User preferences may be applied as either a filter (e.g., removing all queries that do not match user preference) or a bias (e.g., providing additional weight to the rank of queries that match the user preference over other queries). User filters or biases may be configurable on a per sport or a per team basis. For example, a given user may be interested in all teams from the NFL, but only a single team in the NBA. While interested in all NFL teams, he/she may bias a particular team or set of players.

In some embodiments, end user affinity is further affected by the physical location of the user. A user located in a city where a given athletic contest is occurring up-ranks queries relating to that contest and players therein. Similarly to user engagement en masse, past engagement (or lack thereof) by a single user affects the query rank of future generated queries for that user. A given user may influence future system query ranking (for himself/herself) based on the relevant query type, players, teams, or sports they engage with queries for. Through user actions, a user may generate filters or biases over time without expressly creating those filters or biases. Unlike actions en masse, there is no snowball problem when applying a direct correlation (or a more effective correlation) between an individual's engagement history to query ranking. Where a specific user prefers a certain method of engagement, enforcing that engagement pattern does not affect the engagement pattern of other users.

Operational Affinity:

Operational affinity relates to goals held by operators of the application server. For example, where "the house" is operating a betting scenario via delivered queries, it behooves the house to modify the factors by which queries are ranked. For example, in some embodiments, the house affects the ranking algorithm to minimize/maximize exposure on a given query. Should the user base win on a given query, the house does not want too great a percentage of the user base to be engaged in that query. The effect of the house's interest in a given query operates on a parabolic curve relating to user engagement. To a point, user engagement is encouraged. Once a certain position is reached (depending on size of the user base, and the percentage of the user base engaging with an opposite position), user engagement is discouraged. Conversely, a query that is structured in the opposite becomes encouraged as the positive query is engaged with. Opposite may refer to a pair of queries that are the same with the exception of the word "not", "won't" or other negating terms. In some cases, an opposite query takes a position that is a mutually exclusive alternate of a position held by another query. The degree to which a given query is encouraged or discouraged in the ranking algorithm operates on the slope of the parabolic curve.

In some embodiments, the ranking algorithm may be configured to push long shot queries (e.g., a query that is in favor of a given football team scoring 21 points in two minutes of game clock), or promotional incentives (e.g., application operator interest in a particular game). Promotional queries are generated through direct intervention by application administrators in the ranking algorithm.

Competition Affinity:

Competition affinity refers a given user's performance in correctly predicting game events as compared to other users. In some embodiments, users who engage with queries that result in correct predictions more often are provided additional rewards for "hot streaks" (with respect to the user, as opposed to athlete actions). In a given day, or other operative unit of time, system users are matched up on a leaderboard. Queries each have a risk and reward proposition associated with them. Users trying to catch the leader may have queries associated with a higher risk/reward profile up-ranked for them. Users in the lead may have queries associated with an even risk/reward profile up-ranked for them in order to maintain their position. As time remaining on a given leaderboard competition gets close to ending, queries that enable greater movement on the leaderboard are up-ranked. High risk/high-reward queries tend to lead to greater leaderboard movement and are accordingly up-ranked.

In some embodiments, leaderboards are configured based on physical location of users, where users whom are in the same geographic region are grouped together. Users within the same leaderboard up-rank queries directed at competitive balance between those users. Where users of a given leaderboard tend to engage with a particular query, that query is dynamically up-ranked so that other users associated with that leaderboard are presented that query.

Ranking Formula:

References to up-ranking and down-ranking in response to a given factor may be implemented as additive to a total rank score, or as a scalar to the total rank score or a portion of the rank score. The magnitude of an additive or scaler depends on weighting choices of a particular embodiment. Shifts in whether a given factor causes an up-rank or a down-rank may be influenced by absolute or dynamic thresholds regarding values held by those factors.

Magnitude Adjustment Feedback Loop:

The way users engage with queries further informs the magnitudes applied to future queries. A given query is "will player X, score Y points in Z time" and that query is offered with certain odds. The relevant magnitudes are the values of Y, Z, and the odds. Based on the number of users whom engage with a query at a certain set of magnitudes, the system may adjust the magnitudes to reduce or to increase engagement of future queries. Based on the given variable, and whether the goal is to increase or decrease engagement on a given query type magnitudes are altered. For example, requiring more points before a predictive query is satisfied reduces engagement because the likelihood of predictive success is lower. Conversely, increasing the amount of time allotted for the prediction to come true increases engagement because the likelihood of predictive success is greater.

In some embodiments, the queries: "will player X score at least 5 points in 2 minutes?" and will player X score at least 10 points in 2 minutes?" will rank the same in the ranking system. However, one would expect the engagement of the former query to be greater because the former query is objectively easier to satisfy. Based on target engagement goals, the magnitudes of future queries are adjusted. Because of the rate at which queries are generated and put into circulation in front of users, the feedback loop has a dynamic effect on the queries generated and presented. Traditionally sports betting activity readjusts on a per game basis. If one bet was over engaged with, magnitude adjustments do not go into effect until additional bets are decided for a following game (at least 24 hours later). The feedback loop disclosed herein enables updates to generated queries in time measured in seconds.

In some embodiments, magnitudes are further adjusted based on input feeds. If a given player is on a hot streak in their game, magnitudes for queries may be less generous towards the users engaging with the queries. "Generosity" is determined on a variable by variable basis depending on the sport and players involved in the query.

Figure 3:
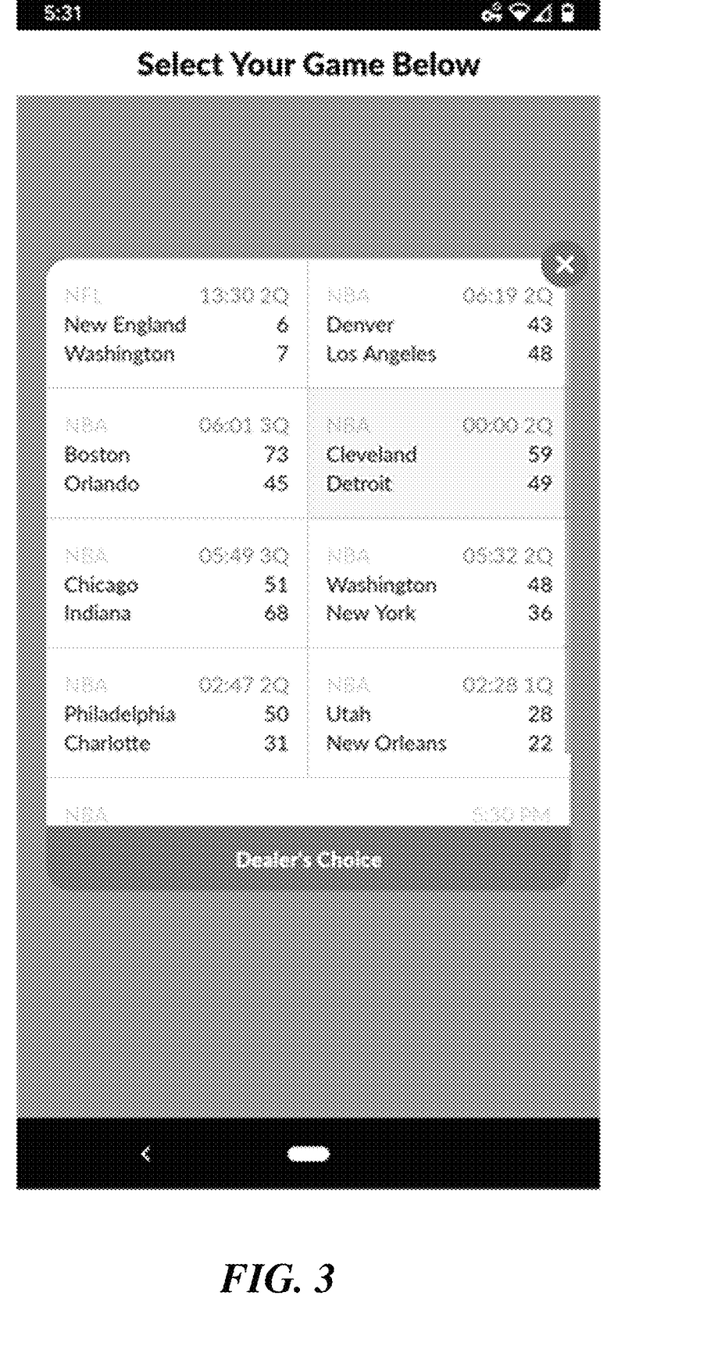
FIG. 3 is a screen shot of a query selection screen.

FIG. 3 is a screen shot of a query selection screen. Depicted in the screen shot is a menu that includes all active athletic contests presently occurring. A user may select a given contest from the menu in order to narrow the field of queries that they receive (e.g., queries directed to other contests are filtered out of the query ranking process). At the bottom of the menu, a "Dealer's Choice" button indicates a willingness to accept queries relating to any active contest. The menu indicates a current status of each contest, and the relevant league.

Figure 4:
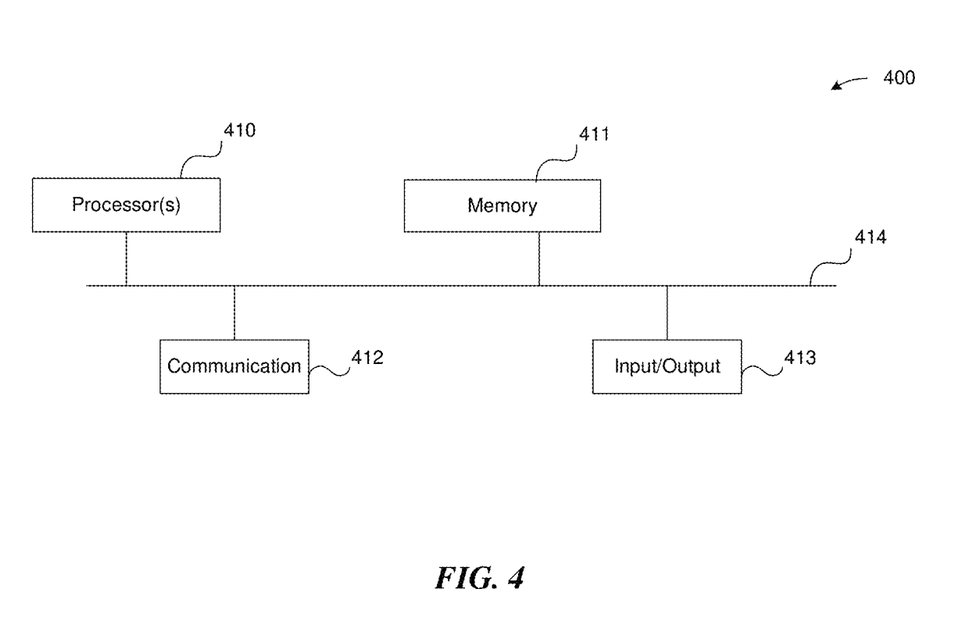
FIG. 4 is a high-level block diagram showing an example of a processing device that can represent a system to run any of the methods/algorithms described above.

FIG. 4 is a high-level block diagram showing an example of a processing device 400 that can represent a system to run any of the methods/algorithms described above. A system may include two or more processing devices such as represented in FIG. 6, which may be coupled to each other via a network or multiple networks. A network can be referred to as a communication network.

In the illustrated embodiment, the processing device 400 includes one or more processors 410, memory 411, a communication device 412, and one or more input/output (I/O) devices 413, all coupled to each other through an interconnect 414. The interconnect 414 may be or include one or more conductive traces, buses, point-to-point connections, controllers, scanners, adapters and/or other conventional connection devices. Each processor 410 may be or include, for example, one or more general-purpose programmable microprocessors or microprocessor cores, microcontrollers, application specific integrated circuits (ASICs), programmable gate arrays, or the like, or a combination of such devices. The processor(s) 410 control the overall operation of the processing device 400. Memory 411 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 811 may store data and instructions that configure the processor(s) 410 to execute operations in accordance with the techniques described above. The communication device 412 may be or include, for example, an Ethernet adapter, cable modem, Wi-Fi adapter, cellular transceiver, Bluetooth transceiver, or the like, or a combination thereof. Depending on the specific nature and purpose of the processing device 400, the I/O devices 413 can include devices such as a display (which may be a touch screen display), audio speaker, keyboard, mouse or another pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Physical and functional components (e.g., devices, engines, modules, and data repositories, etc.) associated with processing device 400 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip (e.g., software, software libraries, application program interfaces, etc.). The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A method of executing a query engagement engine comprising:
    periodically generating a plurality of queries during an athletic contest, wherein each query of the plurality of queries is based on a real-time status of the athletic contest, the plurality of queries each includes an actor component, an action component, and a time period component;
    generating a sorting rank for the queries, wherein the sorting rank for a first query is based on a first magnitude associated with the action component and/or the time period component and any of:
        a history of query engagement of a first user of the query engagement engine;
        a history of query engagement across a plurality of users of the query engagement engine;
        content of a most-recent game action received from an athletic contest descriptive feed;
        a hierarchy of objective characteristics of the athletic contest; or
        a percentage of a user-base whom have engaged with an opposite query to the first query;
    identifying an amount of user-base engagement with the first query; and
    modifying an influence on ranking of a second magnitude associated with a subsequent query based on the amount of user-base engagement with the first query and a difference between the first magnitude and the second magnitude.

2. The method of claim 1, further comprising:
    communicating a set of queries of the plurality of queries ordered based on the sorting rank to a client application on a display device.

3. The method of claim 1, wherein said generating a ranking is further based on a Z-score of a value of the actor component.

4. The method of claim 1, further comprising:
    receiving, by an application server through a client application, user engagement with the first query by the first user.

5. The method of claim 4, further comprising:
    validating the first query as true based on a content of the athletic contest descriptive feed occurring after a first timestamp of the first query; and in response to said validating, executing a first game action associated with the first user having had engaged with the first query.

6. A system of executing a query engagement engine comprising:
- a backend application server including a first memory, the first memory including instructions that when executed cause the backend application server to periodically generate a plurality of queries during an athletic contest, wherein each query of the plurality of queries is based on a real-time status of the athletic contest, and wherein the instructions further cause the backend application server to generate a sorting rank for a first plurality of queries based on content of a most-recent game action received from an athletic contest descriptive feed;
- a network interface configured to communicate with the athletic contest descriptive feed and identify the content of a most-recent game action; and
- a client application configured to operate on mobile devices and correspond with the backend application server via the network interface, the client application further configured to display a set of queries of the plurality of queries ordered based on the sorting rank wherein users of the client application are enabled to engage with the set of queries via a graphic user interface; and wherein the client application is further configured to time-out the set of queries after a timing-out period and replace the set of queries with a second set of queries including queries having the highest sorting rank among a second plurality of queries periodically generated after the first plurality of queries, wherein the users are enabled to engage with the second set of queries via the graphic user interface.

7. The system of claim 6, wherein the sorting rank is further based on any of:
- a history of query engagement of a first user of the query engagement engine;
- a history of query engagement across a plurality of users of the query engagement engine;
- content of the most-recent game action received from the athletic contest descriptive feed;
- a hierarchy of objective characteristics of the athletic contest evaluated in real-time; or
- a percentage of a user-base whom have engaged with an opposite query to the first query.

8. The system of claim 6, wherein each query of the plurality of queries includes an actor component, an action component, and a time period component.

9. The system of claim 8, wherein said the sorting rank is further based on a magnitude associated with any of:
- the action component; or
- the time period component.

* * * * *